July 15, 1969     R. F. ONSRUD     3,455,611
RIGHT ANGULAR TANGENTIAL BEARING
Filed Aug. 8, 1966     2 Sheets-Sheet 1
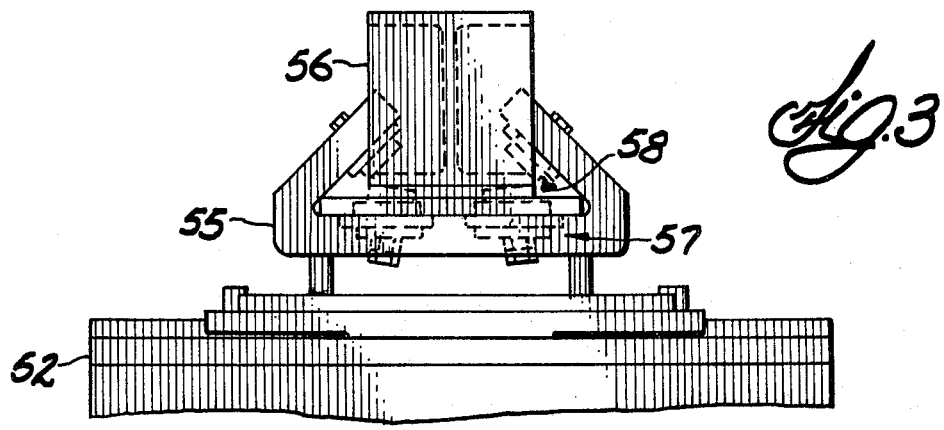
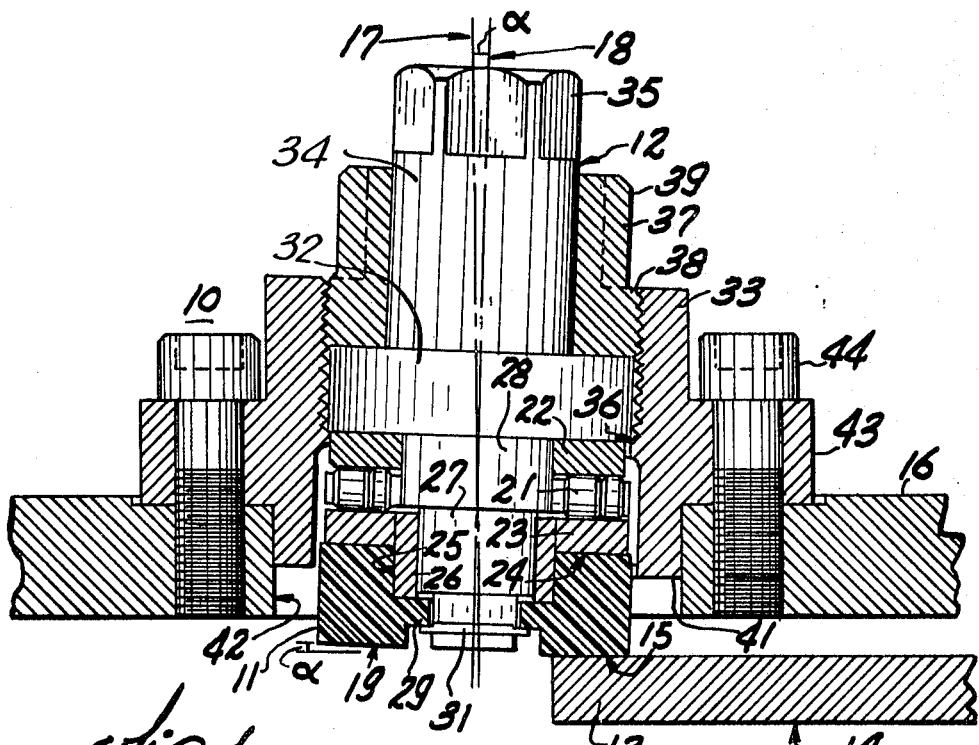
INVENTOR.
Rudolph F. Onsrud
BY Pendleton, Neuman,
Seibold & Williams
Attorneys July 15, 1969 R. F. ONSRUD 3,455,611
RIGHT ANGULAR TANGENTIAL BEARING
Filed Aug. 8, 1966 2 Sheets-Sheet 2
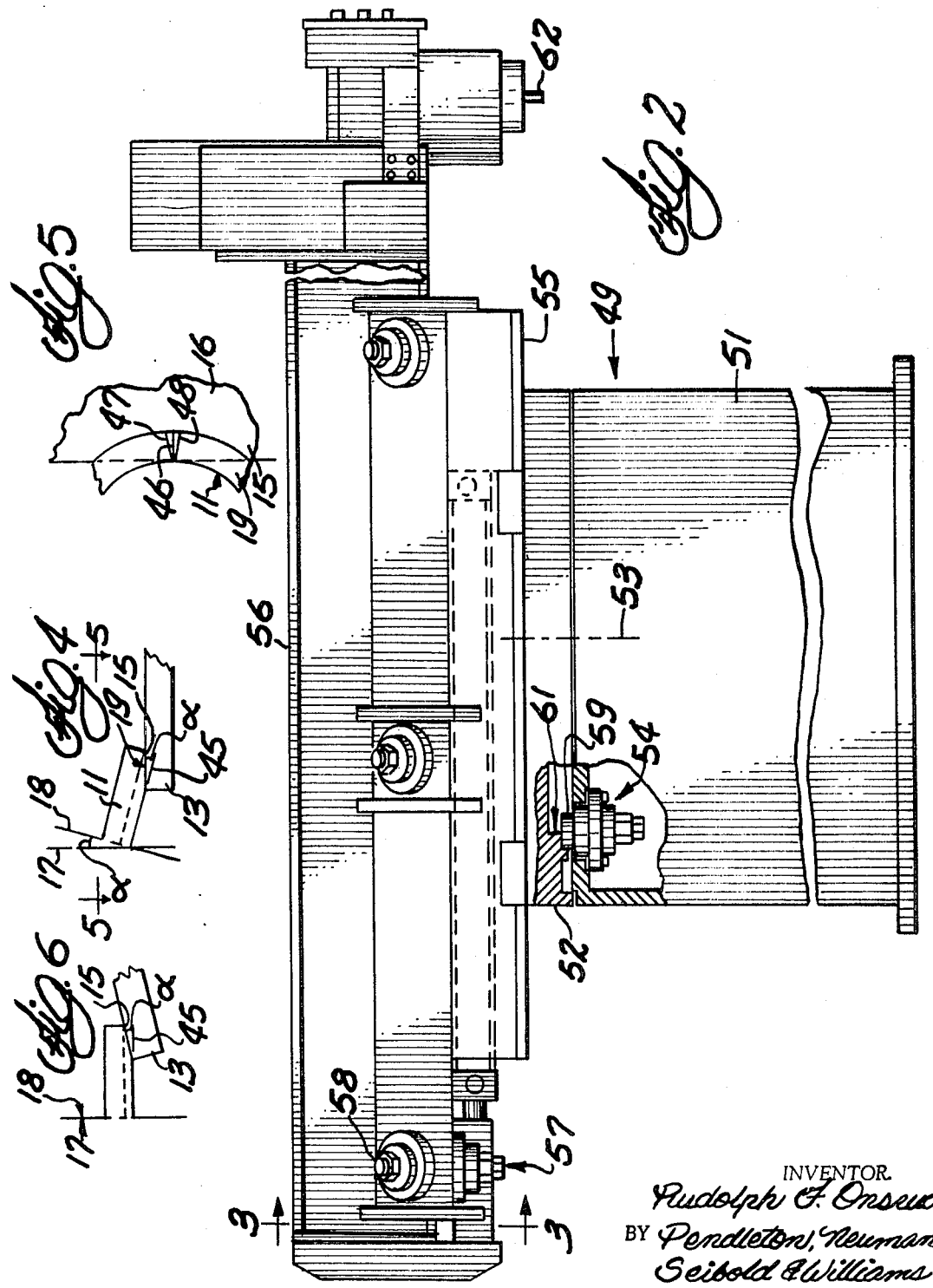
INVENTOR.
Rudolph F. Onsrud
BY Pendleton, Neuman
Seibold & Williams
Attorneys

United States Patent Office 3,455,611
Patented July 15, 1969

3,455,611
RIGHT ANGULAR TANGENTIAL BEARING
Rudolph F. Onsrud, Glenview, Ill., assignor to Onsrud Machine Works, Inc., Niles, Ill., a corporation of Illinois
Filed Aug. 8, 1966, Ser. No. 570,832
Int. Cl. F16c 28/00
U.S. Cl. 308—6           10 Claims

ABSTRACT OF THE DISCLOSURE

A rotatable bearing for facilitating movement between two members in a plane substantially perpendicular to the axis of rotation of the bearing, the pivot around which the bearing rotates being affixed to the first of these members, the surface of the bearing in contact with the second of these members being slightly conical in shape, the axis of rotation of the bearing being at a slight angle to the bearing surface of the second member, and the bearing being made of a slightly deformable material so that when the load on the bearing is increased the area of contact between the bearing and the bearing surface of the second member will be increased.

---

This invention relates to bearings whose axes of rotation are at right angles to the plane of movement of the member or members supported by the bearing, and it is an object of the invention to provide improved bearings of this nature.

It is a further object of the invention to provide an improved bearing of the character indicated wherein the engagement between the rotatable bearing member and the bearing surface on which it runs is essentially tangential.

It is a further object of the invention to provide an improved bearing of the character indicated wherein the rotatable bearing member consists of a slightly deformable synthetic material.

It is a further object of the invention to provide an improved bearing of the character indicated enabling the achievement of reduced bearing wear and longer bearing life.

It is still a further object of the invention to provide an improved bearing of the character indicated enabling the achievement of reduced costs, while achieving greater efficiency in operation.

Bearing members such as balls, or rollers, since time immemorial, have been made of hardened and toughened steels, or alloys, and the raceways or other bearing surfaces against which the balls or rollers bore, likewise, have been made of hardened and toughened steels or alloys in order to withstand the high stresses in operating parts associated with machines for machining ever increasingly hard materials. Consequently, ball and roller bearings have tended to become larger and heavier to withstand the incident stresses, as have also the bearing supports and the machines themselves.

A significant factor in bearing design is that of having sufficient bearing surface while, at the same time, reducing friction as much as possible. This object is achieved according to the invention by using a synthetic plastic material which is slightly deformable under load so as to increase the available load bearing area. This reduces the operating stress. Synthetic materials such as the phenolic resin materials have relatively low coefficients of friction, long life and dimensional stability, and it has been found that these materials make very good bearings for these reasons, while, at the same time, retaining accuracy and permitting decreased weight and softer materials to be used for the surfaces on which the bearing rollers ride. The latter object is achieved by the fact that the slight deformation to which the synthetic roller is subject increases the bearing surface and decreases resulting stress. Thus, bearing surfaces of soft steel or aluminum may, for example, be used.

In carrying out the invention in one form a bearing structure of the form wherein the center line of the bearing location is essentially perpendicular to the general plane of movement of the supported surface is provided comprising an annular rotatable bearing member whose bearing surface is at a small angle to the normal of the axis of the annular bearing member and defines an acute angle with said axis, the axis of said annular member being at the said same angle to such center line, and said annular bearing member consists of a slightly deformable synthetic material.

Further objects and advantages of the invention will be apparent to those skilled in the art from a consideration of the following specification and drawings in which:

FIG. 1 is a sectional view of a right angular bearing structure according to the invention;

FIG. 2 is a side view, partially broken away, of a ram radial arm router utilizing synthetic roller bearings according to the invention;

FIG. 3 is an end view taken substantially in the direction of arrows 3—3 of FIG. 2;

FIG. 4 is a diagrammatic view illustrating a roller bearing and cooperating bearing surface according to one form of the invention;

FIG. 5 is a similar diagrammatic view taken substantially in the direction of arrows 5—5 of FIG. 4; and FIG. 6 is a similar diagrammatic view illustrating a roller bearing and cooperating bearing surface according to another form of the invention.

Referring more particularly to the drawings the invention is shown in FIG. 1 as comprising a bearing 10 including a synthetic annular roller 11, a roller shaft 12, a bearing member 13 (portion of machine part 14) including a bearing surface 15, and a machine part 16 which is representative of the structure supported by the bearing. The bearing surface 15, as shown in FIG. 1, is horizontal and the generalized axis of the bearing, at right angles to the bearing surface 15, may be considered to be the center line 17, shown dot dash. The axis around which the roller 11 actually rotates is the dot dash line 18 which is disposed at a small angle alpha to the center line 17. The bearing surface 19 of roller 11 is likewise formed at the same angle alpha with respect to the normal of the axis 18. Accordingly, the roller 11 has a slightly truncated configuration, the surface 19 being at the angle alpha throughout the whole revolution of the roller. Since the bearing surface 19 is an angle alpha to the normal of bearing axis 18, and the axis 18 is at the same angle alpha to the vertical center line 17, the bearing surface 19 and the bearing surface 15 come into precise engagement. The direction of movement of part 16 carrying the bearing is at right angles to the plane of FIG. 1, and essentially at right angles (except for the angle, alpha) to the axis of rotation of roller 11.

The roller 11 must be freely rotatable about its axis 18. To this end, bearing rollers 21 are provided and operated between two annular races 22 and 23. The upper surface 24 of roller 11 abuts against the lower surface of race 23 and, if desired, may be bonded thereto. The inner surface 25 of roller 11 is relatively tightly received around the outer surface of a bushing 26 and may be bonded thereto, bushing 26 being freely rotatable about the shaft portion 27 of roller shaft 12. The upper portion of bushing 26 is receivable within the inner surface of race 23, the inner surface of race 22 fitting snugly around the portion 28 of roller shaft 12 so as to remain relatively stationary. The roller 11 includes an inwardly directed abutment 29 against which one end of bushing 26 bears at one side and against whose other side a flexible spring retaining member 31 bears for holding the roller 11 on the shaft 12.

An enlarged flange 32 forms part of roller shaft 12 and is threaded at its exterior circumference to be received by corresponding threads on the interior surface of ferrule 33. Projecting upwardly from flange 32 is an extension 34 of roller shaft 12 which terminates in a nut portion 35. By applying a tool to the nut portion 35 the roller shaft 12 may be threaded into the ferrule 33 to a desired position preferably to where the flange 32 bears against a shoulder 36 interiorly of ferrule 33. A retaining member 37 has an interior surface to just slidably fit around the extension 34 and includes a threaded portion 38 to engage with the corresponding threads on the interior of ferrule 33. The outer portion 39 of retainer 37 includes nut surfaces so that by the application of a tool the retainer 37 may be screwed into ferrule 33 to abut against flange 32 thereby holding the roller shaft 12 firmly in position. A lower portion 41 of ferrule 33 has an interior bore of sufficient diameter to receive the bearing races 22, 23 and roller 11, the outer surface of portion 41 being easily and accurately receivable in a bore 42 formed in machine part 16. The ferrule 33 also includes an enlarged flange 43 which abuts against the machine part 16 and to which it is attached by appropriate bolts or cap screws 44 for attaching the bearing structure to the machine part 16.

Other arrangements for holding the synthetic roller 11 to a roller shaft 12 and for holding the bearing structure to a machine part 16 may be devised by those skilled in the art, it being necessary that the roller 11 be freely rotatable, be firmly attached to the appropriate machine part, and have its axis tilted at a slight angle such that the bearing surface 19 engages, essentially tangentially, the bearing surface 15.

The operation of the synthetic roller 11 may be understood by considering FIG. 1 together with FIGS. 4 and 5, the latter figures being somewhat schematic, and the same applicable reference characters having been applied.

Referring to FIGS. 4 and 5, it will be noted that the roller 11 has a bearing surface 19 engaging the bearing surface 15 forming part of a bearing member 13. The bearing surface 19 is at an angle, alpha, to the normal of axis 18, the normal being shown diagrammatically by line 45. Since the axis 18 is at the same angle, alpha, relative to the center line 17, the bearing surface 19 would engage the cooperating bearing surface 15 along a straight line shown schematically in FIG. 5 by line 46 if there were no load on roller 11, i.e., no deformation at all could take place. In practical structures, however, the bearing takes whatever load it is subject to including the weight of the machine parts plus the load due to operating conditions. Under such loads, the synthetic roller 11 will deform slightly and, thus, the engagement of bearing surface 19 with bearing surface 15 will be along an area defined by lines 47 and 48 (FIG. 5). The bearing area between lines 47 and 48 while greater than that of line 46 is nevertheless still small in order to keep the bearing area at a minimum. The fact that the bearing axis 18 is at an angle to the center line 17 causes the bearing surface 19 to extend upwardly and away from bearing surface 15, thus giving the line 46 contact under no load and the area 47, 48 contact under load conditions. The contact is essentially tangential.

The angle between the bearing axis 18 and the bearing surfaces 15, 19 is an acute angle of ninety degrees less the angle alpha.

It will be apparent to those skilled in the art that the axis 18 of the bearing may be vertical to coincide with the center line 17, but under these conditions the bearing surface 15 must be disposed at an angle, alpha, relative to the normal 45 of the bearing axis. A construction of this form is shown diagrammatically in FIG. 6. The angle, alpha, may vary somewhat depending on the particular conditions, but in one practical construction an angle of one degree was found to give good results.

It has been found that the roller 11 may advantageously be made of synthetic materials which are uniformly dense and may be laminated thermosetting plastic materials. For example, such synthetic materials may be made with various types of filler materials, such as cotton fabrics, papers, asbestos papers, asbestos cloth, woven fiber glass cloth, nylon fabric, etc., all impregnated with phenolic or melamine resins and then laminated under heat and pressure. Such materials are available under the trademark Synthane, and are described in the "Handbook of Material Trade Names," Zimmerman and Lavine, 1953 Edition, published by Industrial Research Service, Dover, N.H. Other forms of synthetic material may be used, for example, thermosetting material utilizing urea- and phenol-formaldehyde resins absorbed in a fibrous base cured at high temperatures and pressures. One well-known material of this type is made and sold under the trade name of Formica, as described in the same published reference.

These synthetic materials are substantially rigid, have good dimensional stability, long life, desired frictional coefficients and are deformable under load slightly to give the larger bearing surface area as described. The increased bearing surface consequently reduces the resulting bearing stress in the synthetic roller. Hence, longer life is achieved. Moreover, the material forming the bearing surface 15 may be softer and lighter than hardened steel. For example, aluminum or the like may be used with consequent improvements in weight and cost.

Referring to FIGS. 2 and 3, there is shown a ram radial arm router 49 in which the synthetic bearings, as described, are utilized. The router 49 includes a pedestal or base 51 having an upper portion 52 which is mounted to rotate, about an axis 53, upon several synthetic roller bearings 54 of the nature described. The upper portion 52 includes a guide 55 shown as being of a somewhat triangular shape (FIG. 3), and a slide or ram 56 which is supported within the guide 55 by two series 57 and 58 of synthetic roller type bearings of the character described. The bearings 57 as shown diagrammatically in FIG. 3 have their axes at a slight angle to the vertical and the bearing surfaces at a slight angle to the normal of the axes for taking the vertical load imposed by slide or ram 56. The synthetic roller bearings 58, as shown diagrammatically in FIG. 3, engage the side surfaces of ram 56 in order to maintain the ram in a straight line position during horizontal movements. The synthetic bearing rollers 54, as shown in FIG. 2, support the weight of the member 52, guide 55, ram 56, etc., during operation and include synthetic rollers 59 engaging an appropriate bearing surface 61 on part 52. A typical router cutter 62 is shown attached to the slide 56 to perform the router operations, as is well understood by those skilled in the arts.

It will be recognized that the bearing structure as illustrated in FIG. 1, is utilized in the bearings 54, 57 and 58, although the structure, as shown in FIG. 1, is disposed right side up for convenience in description.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. Bearing structure comprising a metal working machine having bed and tool head components capable of relative motion, a first bearing surface on one of said components and a bearing assembly attached to the other of said components, said bearing assembly comprising an annular bearing member capable of rotation about a single axis fixed relative to said other component and having a second bearing surface engaging said first bearing surface to substantially the outward extremity of said annular bearing member, said second bearing surface being at a small angle to the normal of the axis of said annular bearing member measured from said normal in a direction toward said other component, the axis of said annular bearing member being at an angle to said first bearing surface equal to ninety degrees minus said small angle, and said annular bearing member consisting of a slightly deformable synthetic material.

2. Bearing structure as defined in claim 1 wherein said tool head component is adapted to move relative to said bed component.

3. Bearing structure as defined in claim 1 wherein the annular bearing member consists of a thermosetting, plastic material.

4. Bearing structure as defined in claim 1 wherein the annular bearing member consists of a laminated, impregnated, thermosetting, plastic material.

5. Bearing structure as defined in claim 1 wherein the annular bearing member consists of a thermosetting, impregnated, laminated, phenolic resin material.

6. Bearing structure as defined in claim 1 wherein the annular bearing member consists of a thermosetting, impregnated, laminated, melamine resin material.

7. Bearing structure as defined in claim 1 wherein the annular bearing member consists of thermosetting, impregnated ureaic and phenolic resin material.

8. A metal working machine having bed and tool head components capable of relative motion wherein one of said components is supported by the other of said components and including a bearing structure comprising a first bearing surface on one of said components and a bearing assembly attached to the other of said components having a center line location perpendicular to the general plane of movement of the supported one of said components and comprising an annular bearing member capable of rotation about a single axis fixed relative to that one of said components to which said bearing assembly is attached, said annular bearing member having a second bearing surface at a small angle to the normal of the axis of said annular bearing member measured in a direction from said normal toward said one of said components to which said bearing structure is attached, said second bearing surface being in engagement with said first bearing surface to substantially the outward extremity of said annular bearing member, the axis of said annular bearing member being at said small angle to said center line, and said annular bearing member consisting of a slightly deformable synthetic material.

9. The metal working machine as defined in claim 8 wherein the annular bearing member consists of a thermosetting plastic material.

10. The metal working machine as defined in claim 8 wherein the annular bearing member consists of a thermosetting, plastic phenolic material.

References Cited

UNITED STATES PATENTS

| | | | |
|---|---|---|---|
| 2,631,328 | 3/1953 | Kramcsak | 16—45 |
| 2,156,580 | 5/1939 | Best | 308—6 XR |
| 2,196,215 | 4/1940 | Kraus | 308—6 |
| 2,773,357 | 12/1956 | Canter | 308—6 XR |
| 2,912,288 | 11/1959 | Griswold | 308—6 |
| 3,047,954 | 8/1962 | Hislop | 308—6 XR |
| 3,171,697 | 3/1965 | Nicolaides | 308—190 XR |
| 3,283,358 | 11/1966 | Merriam | 308—238 XR |
| 3,328,101 | 7/1967 | Sullivan | 308—238 |

MARTIN P. SCHWADRON, Primary Examiner

FRANK SUSKO, Assistant Examiner